United States Patent
Koga et al.

(10) Patent No.: US 7,838,151 B2
(45) Date of Patent: Nov. 23, 2010

(54) NON-AQUEOUS ELECTROLYTE SECONDARY BATTERY

(75) Inventors: Hideyuki Koga, Kobe (JP); Hiroshi Sawada, Kobe (JP); Katsutoshi Takeda, Kobe (JP); Masahisa Fujimoto, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 781 days.

(21) Appl. No.: 11/517,354

(22) Filed: Sep. 8, 2006

(65) Prior Publication Data

US 2007/0054192 A1 Mar. 8, 2007

(30) Foreign Application Priority Data

Sep. 8, 2005 (JP) ............................. 2005-261162

(51) Int. Cl.
*H01M 4/58* (2010.01)
(52) U.S. Cl. ............... 429/231.95; 429/218.1; 429/223; 429/224
(58) Field of Classification Search ............. 429/231.95
See application file for complete search history.

(56) References Cited

FOREIGN PATENT DOCUMENTS

| JP | 10199525 | * | 7/1998 |
|---|---|---|---|
| JP | 2000-133249 A | | 5/2000 |
| JP | 2003-151549 A | | 5/2003 |
| JP | 2005235628 | * | 9/2005 |

OTHER PUBLICATIONS

Tsutomu Ohzuku, et al., "Electrochemistry and Structural Chemistry of $LiNiO_2$ (R3m) for 4 Volt Secondary Lithium Cells," J. Electrochem. Soc., Jul. 1993, pp. 1862-1870, vol. 140, No. 7, The Electrochemical Society, Inc.

* cited by examiner

*Primary Examiner*—Dah-Wei D Yuan
*Assistant Examiner*—Patricia Davis
(74) *Attorney, Agent, or Firm*—McDermott Will & Emery LLP

(57) ABSTRACT

A positive electrode active material including lithium (Li), nickel (Ni), manganese (Mn) and a transition metal that can be in the hexavalent state is used. As the transition metal that can be in the hexavalent state, for example, one or both of tungsten (W) and molybdenum (Mo) can be used. As the positive electrode active material including a plurality of materials as mentioned above, $LiNi_{0.5}Mn_{0.5}O_2$ can be used. As a negative electrode, a carbon material or a silicon material capable of storing and releasing lithium ions can be used.

8 Claims, 4 Drawing Sheets

NON-AQUEOUS ELECTROLYTE SECONDARY BATTERY

BACKGROUND OF THE INVENTION

1. Field of the Invention

The present invention relates to non-aqueous electrolyte secondary batteries comprising a positive electrode, a negative electrode, and a non-aqueous electrolyte.

2. Description of the Background Art

Non-aqueous electrolyte secondary batteries are commonly available today as secondary batteries having high energy density. In a non-aqueous electrolyte secondary battery, for example, charge and discharge occur by the transfer of lithium ions between a positive electrode and a negative electrode.

In such a non-aqueous electrolyte secondary battery, in general, a complex oxide of lithium transition metals having a layered structure of lithium nickelate ($LiNiO_2$), lithium cobaltate ($LiCoO_2$) or the like is used as the positive electrode, and a carbon material that can store and release lithium, a lithium metal, a lithium alloy, or the like is used as the negative electrode (refer to, for example, JP-2003-151549-A).

A specific discharge capacity as large as 150 to 180 mAh/g, a potential as high as approximately 4 V and a theoretical capacity as large as approximately 260 mAh/g can be obtained by using the above-mentioned non-aqueous electrolyte secondary battery.

In addition, an organic solvent such as ethylene carbonate or diethyl carbonate in which an electrolyte salt such as lithium borate tetrafluoride ($LiBF_4$) or lithium phosphate hexafluoride ($LiPF_6$) is dissolved is used as the non-aqueous electrolyte.

While these non-aqueous electrolyte secondary batteries have recently been used as power sources for mobile equipment, a need exists for developing non-aqueous electrolyte secondary batteries having higher energy densities with increasing power consumption caused by expansion in functionality of the mobile equipment.

With respect to lithium cobaltate ($Li_{1-x}CoO_2$) used presently as a positive electrode of a non-aqueous electrolyte secondary battery, if lithium ions of not less than 0.5 ($=x$) are released, a crystal structure collapses and reversibility (storage property and releasing property) is decreased. As a result, the specific discharge capacity that could be obtained is approximately 160 mAh/g at most.

In contrast, with respect to lithium nickelate ($Li_{1-y}NiO_2$) having the same crystal structure as that of $LiCoO_2$, since lithium ions of up to approximately 0.7 ($=y$) can be released, the specific discharge capacity as large as approximately 200 mAh/g that is larger than the specific discharge capacity of $LiCoO_2$ can be obtained.

However, as lithium ions are released, the crystal structure (crystal system) of the above-mentioned lithium nickelate changes to a hexagonal system, a monoclinic system, and a hexagonal system in this order. This change gradually makes the crystal structure of lithium nickelate collapse, resulting in a reduction in the reversibility similarly to lithium cobaltate.

Furthermore, nickel is unstable in the trivalent state ($Ni^{3+}$) and liable to be in the divalent state ($Ni^{2+}$). Therefore, lithium easily evaporates in a synthesis reaction at a high temperature and it is difficult to obtain a positive electrode active material having a stoichiometry.

In addition, since the radius of an ion of lithium is approximate to that of nickel, nickel is mixed in a lithium layer in many cases. As a result, diffusion of lithium is inhibited and it is difficult to produce the synthesis reaction.

In order to solve these problems, sufficient oxidation of nickel has been considered. For example, a method in which burning is carried out in oxygen and a method in which elements at nickel sites are replaced by a variety of elements to stabilize the crystal structure have been considered (refer to, for example, JP-2000-133249-A and H. Arai et al., J. Electrochem. Soc., 140, 1862 (1993)).

However, even if the above-described methods are used, it is difficult to sufficiently prevent diffusion of lithium from being inhibited and a synthesis reaction does not sufficiently occur.

SUMMARY OF THE INVENTION

An object of the invention is to provide a non-aqueous electrolyte secondary battery that includes a positive electrode active material, of which a crystal structure is stable even if lithium ions are released until a high potential is reached, capable of being synthesized in the atmosphere and that can offer a large specific discharge capacity.

A non-aqueous electrolyte secondary battery according to one aspect of the invention includes a positive electrode including a positive electrode active material and capable of storing and releasing lithium, a negative electrode capable of storing and releasing lithium and a non-aqueous electrolyte, wherein the positive electrode active material contains lithium, nickel, manganese and a transition metal that can be in a hexavalent state.

With respect to the non-aqueous electrolyte secondary battery, in the crystal structure of the positive electrode active material including lithium, nickel, manganese and the transition metal that can be in the hexavalent state, if part of manganese at nickel sites is replaced by the transition metal that can be in the hexavalent state, the amount of nickel increases. Therefore, even if all of lithium ions are released from the positive electrode, the valence of nickel is tetravalent or less. As a result, even if lithium ions are released until a high potential is reached, the crystal structure of the positive electrode active material is stabilized and the heat stability is also expected to be improved.

Such a configuration and an action allow the crystal structure of the positive electrode active material to be stabilized and enable a synthesis reaction of the positive electrode active material in the atmosphere even if lithium ions are released during charge and discharge until the high potential is reached. This makes it possible to obtain a large specific discharge capacity.

The transition metal may include one or both of tungsten and molybdenum. In this case, the crystal structure of the positive electrode active material is more stabilized and the heat stability is more improved. As a result, charge and discharge can be carried out in good conditions.

It is preferable that the positive electrode active material is composed of lithium (Li), nickel (Ni), manganese (Mn) and tungsten (W), where the mole ratio is represented as Li:Ni:Mn:W=x:4:y:z in this order. The x is preferably not less than 4 and not more than 12, the y is preferably not less than 0.1 and not more than 1.5 and the z is preferably not less than 0.1 and not more than 1.5. Such a composition allows the crystal structure of the positive electrode active material to be more stabilized and further enhances the heat stability. Consequently, charge and discharge can be carried out in better conditions.

It is preferable that the positive electrode active material is composed of lithium (Li), nickel (Ni), manganese (Mn) and molybdenum (Mo), where the mole ratio is represented as Li:Ni:Mn:Mo=x:4:y:z in this order. The x is preferably not less than 4 and not more than 12, they is preferably not less than 0.1 and not more than 1.5 and the z is preferably not less than 0.1 and not more than 1.5. Such a composition allows the crystal structure of the positive electrode active material to be more stabilized and further enhances the heat stability. Consequently, charge and discharge are carried out in better conditions.

The negative electrode may be composed of a lithium metal, a lithium alloy, a carbon material or a silicon material. Lithium ions are stored in and released from the negative electrode in good conditions by using these materials as the negative electrode. In particular, it is possible to obtain higher energy density by using the negative electrode composed of the carbon material or the silicon material.

The non-aqueous electrolyte may include one or more types selected from the group consisting of cyclic carbonic esters, chain carbonic esters, esters, cyclic ethers, chain ethers, nitrils and amides. In this case, the cost is reduced and the safety is enhanced.

According to the present invention, even if lithium ions are released until the high potential is reached, the crystal structure of the positive electrode active material is stable and the synthesis reaction of the positive electrode active material can be produced even in the atmosphere. This makes it possible to obtain a large specific discharge capacity.

Other features, elements, characteristics, and advantages of the present invention will become more apparent from the following description of preferred embodiments of the present invention with reference to the attached drawings.

DESCRIPTION OF THE PREFERRED EMBODIMENTS

A non-aqueous electrolyte secondary battery according to an embodiment of the invention will be described below with reference to drawings.

The non-aqueous electrolyte secondary battery according to the embodiment comprises a working electrode (hereinafter, referred to as a positive electrode), a counter electrode (hereinafter, referred to as a negative electrode), and a non-aqueous electrolyte.

Note that materials described below and the thickness and the concentration thereof are not limited to the after-mentioned and can be appropriately selected.

(1) Fabrication of Positive Electrode

In the embodiment, a positive electrode active material including lithium (Li), nickel (Ni), manganese (Mn) and a transition metal that can be in the hexavalent state is used.

As the transition metal that can be in the hexavalent state, for example, at least one of tungsten (W), molybdenum (Mo) and chromium (Cr) can be used.

Tungsten and molybdenum are transition metals that are structurally the most stable in the hexavalent state which is the maximum valence that could be obtained. If any of these transition metals in the hexavalent state is in the crystal of the positive electrode active material, this is considered to be effective to stabilize the crystal structure of the positive electrode active material.

Furthermore, part of manganese at nickel sites is replaced by the transition metal that can be in the hexavalent state. This causes the valence of nickel to change from trivalent to bivalent that offers more stability. As a result, the reaction in which the valence of nickel changes from bivalent to tetravalent can be utilized during charge and discharge.

As the positive electrode active material, of which the reaction is utilized in which the valence of nickel changes from bivalent to tetravalent in such a way, $LiNi_{0.5}Mn_{0.5}O_2$ is used. While the valence of nickel in this positive electrode active material is bivalent and the valence of manganese in the positive electrode active material is tetravalent, manganese maintains the stable tetravalent state and the valence of nickel changes from bivalent to tetravalent during charge and discharge.

If part of manganese at nickel sites is replaced by any of the above-mentioned transition metals that can be in the hexavalent state in the aforementioned positive electrode active material $LiNi_{0.5}Mn_{0.5}O_2$, the positive electrode active material becomes $LiNi_{2/3}W_{1/3}O_2$.

As a result, even if the amount of nickel in the positive electrode active material increases and all of lithium ions are released, the valence of nickel in the positive electrode active material becomes not more than tetravalent. Accordingly, even if lithium ions are released until a high potential is reached, it is considered that the positive electrode active material is stabilized structurally and the heat stability is enhanced.

In this embodiment, as mentioned above, it is preferable that all of nickel, manganese and the transition metal that can be in the hexavalent state are included in the positive electrode active material.

A preferable example of the composition of the positive electrode active material including all of these is x:4: y:z ($4 \leq x \leq 12, 0.1 \leq y \leq 1.5, 0.1 \leq z \leq 1.5$) in mole ratio of lithium, nickel, manganese and tungsten in this order.

In addition, another preferable example of the composition of the above-described positive electrode active material is x:4:y:z ($4 \leq x \leq 12, 0.1 \leq y \leq 1.5, 0.1 \leq z \leq 1.5$) in mole ratio of lithium, nickel, manganese and molybdenum in this order.

Although a conducting agent may not be added during fabrication of the positive electrode in the case of using the positive electrode active material with high conductivity, it is preferable to add the conducting agent in the case of using the positive electrode active material with low conductivity.

Any materials with conductivity may be used as the conducting agent, and at least one of an oxide, a carbide, a nitride and a carbon material, which have high conductivity, can be preferably used.

Examples of the oxide with high conductivity include Tin oxide, indium oxide and the like. Examples of the carbide with high conductivity include Titanium carbide (TiC), tantalum carbide (TaC), niobium carbide (NbC), tungsten carbide (WC) and the like.

In addition, examples of the nitride with high conductivity include titanium nitride (TiN), tantalum nitride (TaN), niobium nitride (NbN), tungsten nitride (WN) and the like.

Examples of the carbon material with high conductivity include Ketjen black, acetylene black, graphite and the like.

While it is difficult to improve the conductivity at the positive electrode sufficiently if the amount of an added conducting agent is small, the proportion of the positive electrode active material contained in the positive electrode is small and high energy density is not obtained if the amount of the added conducting agent is large. Accordingly, the amount of the added conducting agent is set to be within the range of 0 to 30% by weight of the entire positive electrode, preferably within the range of 0 to 20% by weight and more preferably within the range of 0 to 10% by weight.

Furthermore, as a binder added during the fabrication of the positive electrode, at least one type selected from the group consisting of polytetrafluoroethylene, polyvinylidene fluoride, polyethylene oxide, polyvinyl acetate, polymethacrylate, polyacrylate, polyacrylonitrile, polyvinyl alcohol, styrene-butadiene rubber, carboxymethylcellulose and the like can be used.

Note that the proportion of the positive electrode active material contained in the positive electrode is small and high energy density is not obtained if the amount of the added binder is large. Accordingly, the amount of the added binder is set to be within the range of 0 to 30% by weight of the entire positive electrode, preferably within the range of 0 to 20% by weight and more preferably within the range of 0 to 10% by weight.

(2) Fabrication of Non-Aqueous Electrolyte

A non-aqueous electrolyte that includes an electrolytic salt dissolved in a non-aqueous solvent can be used.

The non-aqueous solvent may include that for use in general batteries such as cyclic carbonic esters, chain carbonic esters, esters, cyclic ethers, chain ethers, nitrils, amides, or the like and that made by combinations of these.

Cyclic carbonic esters include ethylene carbonate, propylene carbonate, butylene carbonate, and the like. Those in which a portion of or the entire hydrogen group is fluorinated may also be used, such as trifluoropropylene carbonate, fluoroethyl carbonate, and the like, for example.

Chain carbonic esters include dimethyl carbonate, ethyl methyl carbonate, diethyl carbonate, methyl propyl carbonate, ethyl propyl carbonate, methyl isopropyl carbonate, and the like. Those in which a portion of or the entire hydrogen group is fluorinated may also be used.

Esters include methyl acetate, ethyl acetate, propyl acetate, methyl propionate, ethyl propionate, γ-butyrolactone, and the like. Cyclic ethers include 1,3-dioxolane, 4-methyl-1,3-dioxolane, tetrahydrofuran, 2-methyl tetrahydrofuran, propylene oxide, 1,2-butylene oxide, 1,4-dioxane, 1,3,5-trioxane, furan, 2-methylfuran, 1,8-cineole, crown ether, and the like.

Chain ethers include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyetane, triethylene glycol dimethyl ether, tetraethylene glycol dimethyl ether, and the like.

Nitrils include acetonitril and the like. Amides include dimethylformamide and the like.

As the electrolytic salt in the embodiment, those used typically as an electrolytic salt of conventional non-aqueous electrolyte secondary batteries can be used.

A specific example of the electrolytic salt is selected from the group consisting of lithium phosphate hexafluoride ($LiPF_6$), lithium borate tetrafluoride ($LiBF_4$), $LiCF_3SO_3$, $LiC_4F_9SO_3$, LiN ($CF_3SO_2)_2$, LiN ($C_2F_5SO_2)_2$, $LiAsF_6$ and difluoro (oxalato) lithium borate that are soluble in a non-aqueous solvent, not peroxide, and have high safety. One or combinations of not less than two of the above-mentioned electrolytic salts may be used.

In this embodiment, a non-aqueous solvent obtained by mixing ethylene carbonate and diethyl carbonate at a volume ratio of 30:70 is used as a non-aqueous electrolyte with the addition of lithium phosphate hexafluoride as an electrolytic salt at a concentration of 1 mol/l.

(3) Configuration of Negative Electrode

In this embodiment, materials capable of storing and releasing lithium ions are used. Examples of these materials include a lithium metal, a lithium alloy, a carbon material such as graphite, and silicon (Si).

(4) Fabrication of Non-Aqueous Electrolyte Secondary Battery

The non-aqueous electrolyte secondary battery is fabricated as described below using the above-described positive electrode, negative electrode and non-aqueous electrolyte.

Figure 1:
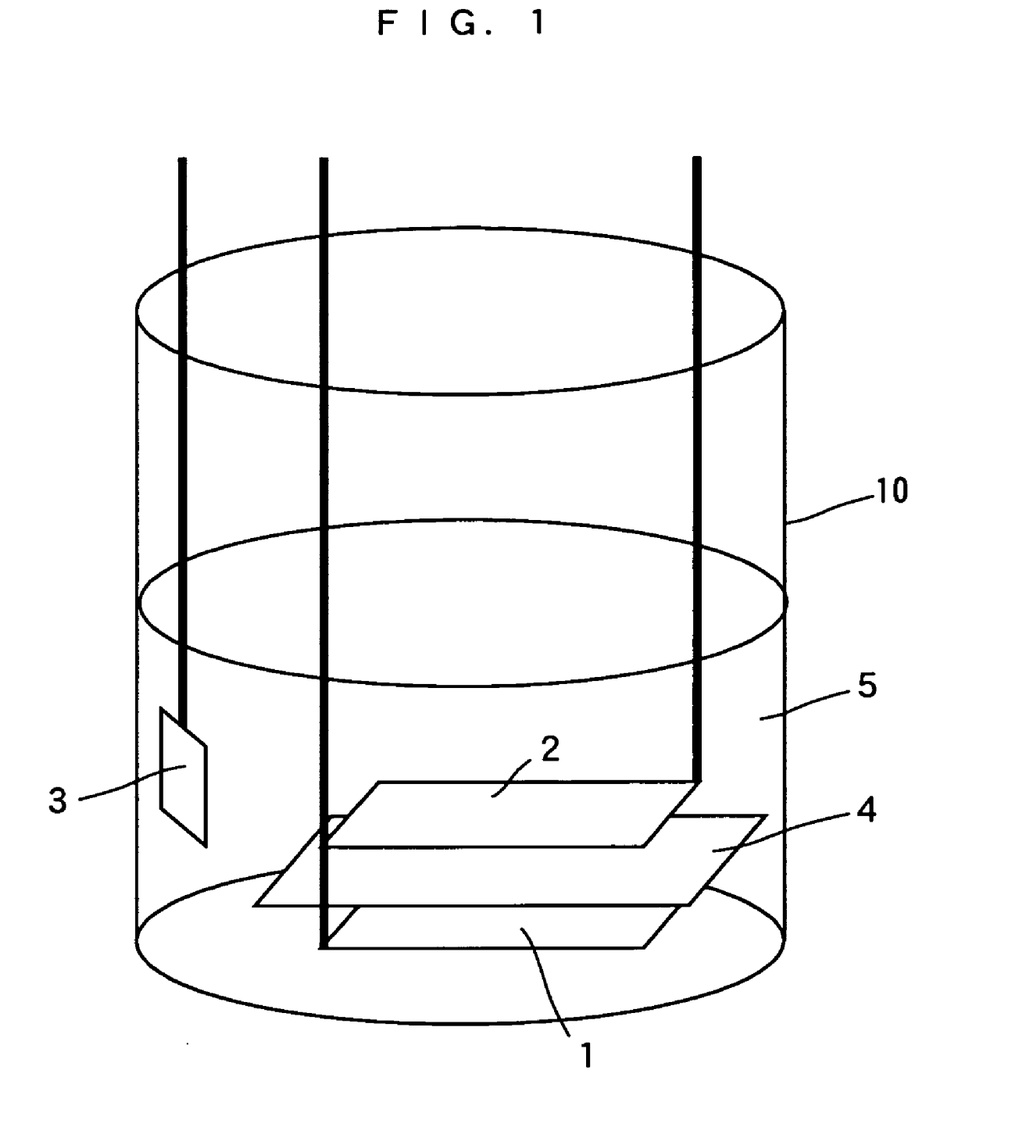
FIG. 1 is a schematic diagram of a test cell of a non-aqueous electrolyte secondary battery according to an embodiment of the invention.

FIG. 1 is a schematic diagram of a test cell of the non-aqueous electrolyte secondary battery according to the embodiment of the invention.

As shown in FIG. 1, leads are attached to the above-described positive electrode 1 and negative electrode 2 that is composed of, for example, a lithium metal, respectively, under an inert atmosphere. Next, a separator 4 is inserted between the positive electrode 1 and the negative electrode 2, and then the positive electrode 1, negative electrode 2, and reference electrode 3 that is composed of, for example, a lithium metal are arranged inside a cell vessel 10. The above-described non-aqueous electrolyte 5 is poured into the cell vessel 10 to fabricate the non-aqueous electrolyte secondary battery as a test cell.

(5) Effects of the Embodiment

In this embodiment, the positive electrode active material including lithium, nickel, manganese and transition metals that can be in the hexavalent state is used, there by making the crystal structure of the positive electrode active material stable even if lithium ions are released until a high potential is reached, and making the synthesis of the positive electrode active material possible even in the atmosphere. This makes it possible to increase a specific discharge capacity of the non-aqueous electrolyte secondary battery.

INVENTIVE EXAMPLES

(a) Inventive Example 1

Lithium carbonate ($Li_2CO_3$), nickel hydroxide ($Ni(OH)_2$), manganese carbonate ($MnCO_3$) and tungsten trioxide ($WO_3$) were used as starting materials of the positive electrode active material.

In this example, the above-mentioned lithium carbonate, nickel hydroxide, manganese carbonate and tungsten trioxide were mixed in a mole ratio of 3:4:0.5:z in this order. The above-mentioned z was set to a total of nine types of 0.0, 0.1, 0.2, 0.4, 0.5, 0.6, 0.8, 1.0 and 1.5 mol.

In addition, nine types of powders of positive electrode active materials obtained by mixing the above-mentioned materials were formed in the shape of pellets, respectively. After that, preliminary burning was carried out on each of these positive electrode active materials in the air atmosphere of 700° C. for ten hours and main burning was carried out in the air atmosphere of 800° C. for twenty hours.

Next, the respective positive electrode active materials obtained by carrying out the main burning were measured by an XRD (X-ray diffraction instrument).

Figure 2:
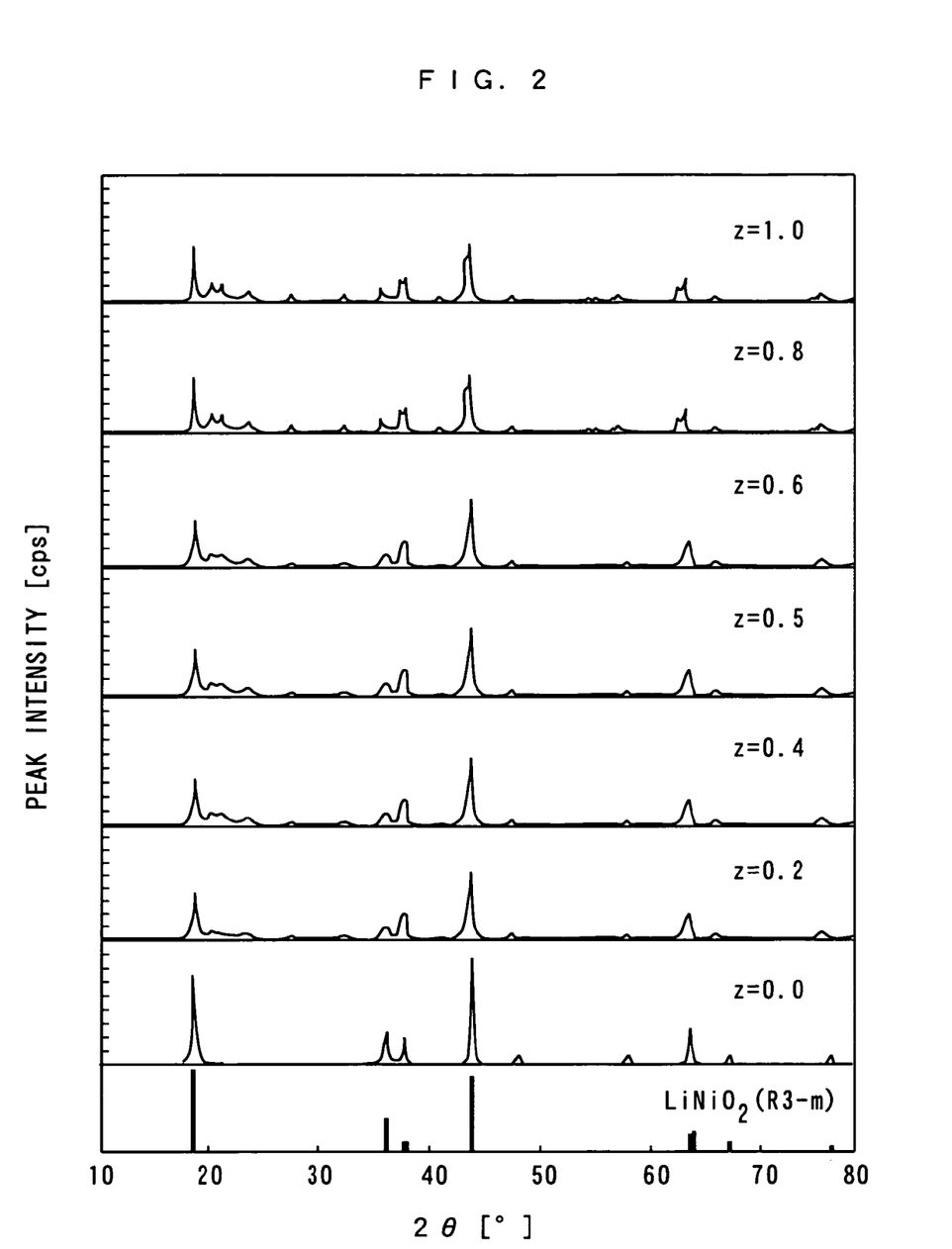
FIG. 2 is a graph showing the measurement results of an XRD measurement of each positive electrode active material.

FIG. 2 is a graph showing the measurement results of the XRD measurement of each positive electrode active material. The XRD measurement results of seven types of positive electrode active materials with different values of z and $LiNiO_2$ of a space group R-3m are shown in FIG. 2.

The results of the XRD measurement as shown in FIG. 2 indicate that the respective positive electrode active materials obtained by the main burning have crystal systems that belong to the space group R-3m similarly to $LiNiO_2$.

Furthermore, the measurement results in FIG. 2 show that as the amount of tungsten (values of z) increases, the peak intensities due to impurities of a tungsten compound increase at diffraction angles 2θ approximately in the range of 20 to 30°. This is considered to be because part of tungsten is not substituted for the elements at nickel sites and is separated off as the tungsten compound.

(b) Inventive Example 2

The non-aqueous electrolyte secondary batteries were fabricated using the respective positive electrode active materials obtained in the above-described Inventive Example 1 and charge and discharge tests were carried out respectively.

In addition, in Inventive Example 2, the positive electrode active material mentioned below was fabricated as a comparative example compared to Inventive Example 1 and a non-aqueous electrolyte secondary battery was fabricated using the fabricated positive electrode active material. First of all, the positive electrode active material of the comparative example is described.

In the comparative example, lithium carbonate ($Li_2CO_3$) and nickel hydroxide ($Ni(OH)_2$) were used as starting materials of the positive electrode active material and mixed in a mole ratio of 1:2.

Furthermore, powders of the positive electrode active material obtained by mixing were formed in the shape of a pellet. After that, preliminary burning was carried out to the positive electrode active material in the air atmosphere of 700° C. for ten hours and main burning was carried out in the air atmosphere of 800° C. for twenty hours.

Next, positive electrodes 1 were fabricated as described below using the respective positive electrode active materials fabricated in such a way.

Positive electrode materials were obtained respectively by mixing 80% by weight of the positive electrode active materials obtained in Inventive Example 1 and the comparative example, 10% by weight of conducting agents of acetylene black, and 10% by weight of binders of polyvinylidene fluoride.

Slurries as positive electrode mixtures were prepared by adding the respective positive electrode materials to N-methyl-2-pyrrolidone solution of 10% by weight of those positive electrode materials respectively.

The prepared slurries were subsequently applied onto pieces of aluminum foil as positive electrode collectors by the doctor blade technique and then dried at 110° C. under vacuum, thereby forming positive electrode active material layers. In addition, the positive electrodes 1 were obtained by attaching positive electrode tabs onto regions of the piece of aluminum foil where the positive electrode active material layers were not formed. Lithium metals cut into a predetermined size were used for the negative electrodes 2 and the reference electrodes 3.

Furthermore, a non-aqueous solvent obtained by mixing ethylene carbonate and diethyl carbonate in a volume ratio of 30:70 was used as the non-aqueous electrolyte 5 with the addition of lithium phosphate hexafluoride as an electrolyte salt at a concentration of 1 mol/l.

The test cells of the non-aqueous electrolyte secondary batteries were fabricated based on the above-mentioned embodiment (FIG. 1) using the above-described positive electrodes 1 (ten types in total), negative electrodes 2, reference electrodes 3 and non-aqueous electrolytes 5.

Figure 3:
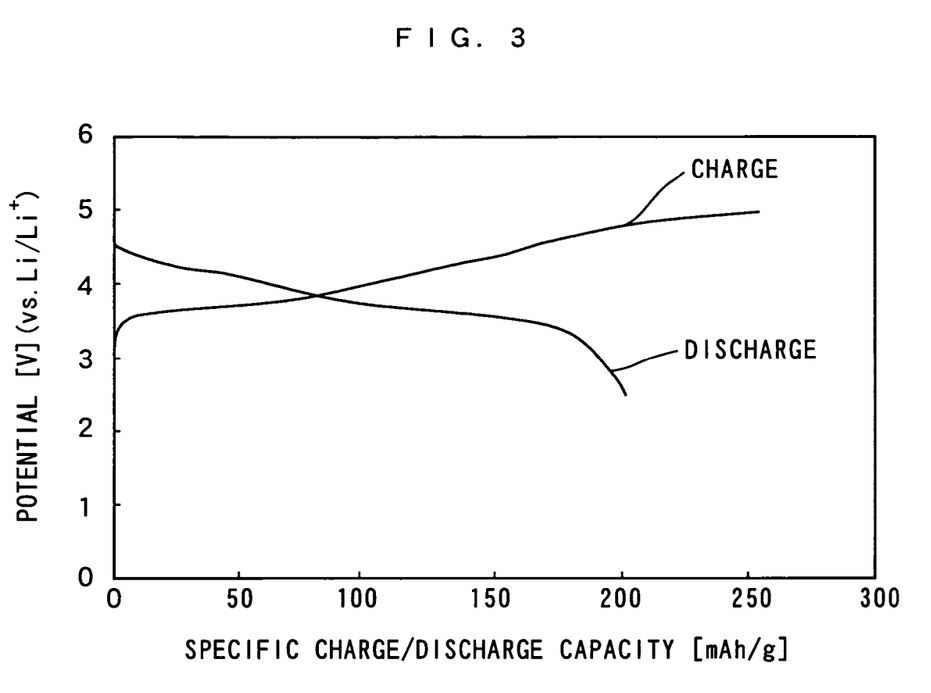
FIG. 3 is a diagram showing charge and discharge characteristics in the case of the positive electrode active material having 0.2 mol of tungsten oxide.

For each fabricated non-aqueous electrolyte secondary batteries, three cycles of charge and discharge were performed. In each cycle, charge was carried out until the potential of the positive electrode 1 with reference to the reference electrode 3 reached 4.5 V, and then discharge was carried out until the above-mentioned potential reached 2.5 V. After the three cycles were performed, charge was carried out until the above-mentioned potential reached 5.0 V. The results are shown in Table 1. In Table 1, the specific discharge capacities in the case where a charge cutoff potential is 4.5 V and in the case where the charge cutoff potential is 5.0 V are shown. Moreover, charge and discharge characteristics in the case of the positive electrode active material with tungsten oxide of 0.2 mol are shown in FIG. 3.

TABLE 1

| POSITIVE ELECTRODE ACTIVE MATERIAL [mol] | CHARGE CUTOFF POTENTIAL 4.5[v](vs.Li/Li$^+$) SPECIFIC DISCHARGE CAPACITY [mAh/g] | CHARGE CUTOFF POTENTIAL 5.0[v](vs.Li/Li$^+$) SPECIFIC DISCHARGE CAPACITY [mAh/g] |
|---|---|---|
| $Li_2CO_3$:$Ni(OH)_2$:$MnCO_3$:$WO_3$ = 3:4:0.5:0 | 180 | 169 |
| $Li_2CO_3$:$Ni(OH)_2$:$MnCO_3$:$WO_3$ = 3:4:0.5:0.1 | 178 | 189 |
| $Li_2CO_3$:$Ni(OH)_2$:$MnCO_3$:$WO_3$ = 3:4:0.5:0.2 | 171 | 201 |
| $Li_2CO_3$:$Ni(OH)_2$:$MnCO_3$:$WO_3$ = 3:4:0.5:0.4 | 135 | 155 |
| $Li_2CO_3$:$Ni(OH)_2$:$MnCO_3$:$WO_3$ = 3:4:0.5:0.5 | 103 | 120 |
| $Li_2CO_3$:$Ni(OH)_2$:$MnCO_3$:$WO_3$ = 3:4:0.5:0.6 | 98 | 115 |
| $Li_2CO_3$:$Ni(OH)_2$:$MnCO_3$:$WO_3$ = 3:4:0.5:0.8 | 82 | 86 |

TABLE 1-continued

| POSITIVE ELECTRODE ACTIVE MATERIAL [mol] | CHARGE CUTOFF POTENTIAL 4.5[v](vs.Li/Li$^+$) SPECIFIC DISCHARGE CAPACITY [mAh/g] | CHARGE CUTOFF POTENTIAL 5.0[v](vs.Li/Li$^+$) SPECIFIC DISCHARGE CAPACITY [mAh/g] |
|---|---|---|
| Li$_2$CO$_3$:Ni(OH)$_2$:MnCO$_3$:WO$_3$ = 3:4:0.5:1.0 | 82 | 79 |
| Li$_2$CO$_3$:Ni(OH)$_2$:MnCO$_3$:WO$_3$ = 3:4:0.5:1.5 | 49 | 56 |
| Li$_2$CO$_3$:Ni(OH)$_2$ = 1:2 | 94 | 91 |

As indicated by Table 1, the specific discharge capacity decreases in the case where the charge cutoff potential is 4.5 V, as the amount of tungsten in the positive electrode active material increases.

Furthermore, as the amount of tungsten oxide in the positive electrode active material decreases from 0.2 mol, and the amount of tungsten oxide in the positive electrode active material increases from 0.2 mol, the specific discharge capacity in the case where the charge cutoff potential is 5.0 V decreases.

In addition, in the comparative example in which manganese carbonate and tungsten oxide were not used as starting materials, the specific discharge capacity in the case where the charge cutoff potential is 5.0 V is smaller than that in the case where the charge cutoff potential is 4.5 V.

Meanwhile, the result of the charge and discharge test (at the top of Table 1) carried out using the positive electrode active material free from tungsten oxide shows that the specific discharge capacity in the case where the charge cutoff potential is 5.0 V is smaller than that in the case where the charge cutoff potential is 4.5 V, similarly to the result of the comparative example.

These results indicate that even if the charge and discharge are carried out until the high potential is reached, the crystal structure of the positive electrode active material is inhibited from collapsing and stabilized by containing tungsten in the positive electrode active material, thereby making it possible to obtain higher energy density.

(c) Inventive Example 3

Lithium carbonate (Li$_2$CO$_3$), nickel hydroxide (Ni(OH)$_2$), manganese carbonate (MnCO$_3$) and tungsten trioxide (WO$_3$) were used as starting materials of the positive electrode active materials.

In this example, the above-mentioned lithium carbonate, nickel hydroxide, manganese carbonate and tungsten trioxide were mixed in a mole ratio of 3:4:y:0.5 in this order. The above-mentioned y was set to a total of eight types of 0.0, 0.1, 0.2, 0.4, 0.6, 0.8, 1.0 and 1.5 mol.

Furthermore, eight types of powders of the positive electrode active materials obtained by mixing were formed in the shape of pellets, respectively. After that, burning was carried out on each of these positive electrode active materials in the air atmosphere of 800° C. for twenty hours.

Similarly to Inventive Example 2, the test cells of the non-aqueous electrolyte secondary batteries were fabricated using the resultant positive electrode active materials and charge and discharge tests were carried out. The results of the tests are shown in Table 2.

TABLE 2

| POSITIVE ELECTRODE ACTIVE MATERIAL [mol] | CHARGE CUTOFF POTENTIAL 4.5[v](vs.Li/Li$^+$) SPECIFIC DISCHARGE CAPACITY [mAh/g] | CHARGE CUTOFF POTENTIAL 5.0[v](vs.Li/Li$^+$) SPECIFIC DISCHARGE CAPACITY [mAh/g] |
|---|---|---|
| Li$_2$CO$_3$:Ni(OH)$_2$:MnCO$_3$:WO$_3$ = 3:4:0:0.5 | 50 | 140 |
| Li$_2$CO$_3$:Ni(OH)$_2$:MnCO$_3$:WO$_3$ = 3:4:0.1:0.5 | 55 | 150 |
| Li$_2$CO$_3$:Ni(OH)$_2$:MnCO$_3$:WO$_3$ = 3:4:0.2:0.5 | 59 | 160 |
| Li$_2$CO$_3$:Ni(OH)$_2$:MnCO$_3$:WO$_3$ = 3:4:0.4:0.5 | 56 | 134 |
| Li$_2$CO$_3$:Ni(OH)$_2$:MnCO$_3$:WO$_3$ = 3:4:0.6:0.5 | 56 | 101 |
| Li$_2$CO$_3$:Ni(OH)$_2$:MnCO$_3$:WO$_3$ = 3:4:0.8:0.5 | 48 | 80 |
| Li$_2$CO$_3$:Ni(OH)$_2$:MnCO$_3$:WO$_3$ = 3:4:1.0:0.5 | 32 | 58 |
| Li$_2$CO$_3$:Ni(OH)$_2$:MnCO$_3$:WO$_3$ = 3:4:1.5:0.5 | 21 | 42 |

As shown in Table 2, as the amount of manganese carbonate in the positive electrode active material decreases from 0.2 mol, and the amount of manganese carbonate in the positive electrode active material increases from 0.2 mol, the specific discharge capacities in the cases where the charge cutoff potentials are 4.5 V and 5.0 V decrease.

(d) Inventive Example 4

Lithium carbonate (Li$_2$CO$_3$), nickel hydroxide (Ni(OH)$_2$), manganese carbonate (MnCO$_3$) and tungsten trioxide (WO$_3$) were used as starting materials of the positive electrode active materials.

In this example, the above-mentioned lithium carbonate, nickel hydroxide, manganese carbonate and tungsten trioxide were mixed in a mole ratio of x:4:1:1 in this order. The above-mentioned x was set to a total of three types of 2.0, 3.0 and 6.0 mol.

Furthermore, three types of powders of the positive electrode active materials obtained by mixing were formed in the shape of pellets, respectively. After that, preliminary burning was carried out on these positive electrode active materials in the air atmosphere of 700° C. for ten hours and main burning was carried out in the air atmosphere of 800° C. for twenty hours.

Similarly to Inventive Example 2, the test cells of the non-aqueous electrolyte secondary batteries were fabricated using the resultant positive electrode active materials and charge and discharge tests were carried out. The results of the tests are shown in Table 3.

As indicated by Table 4, the specific discharge capacity in the case where the charge cutoff potential is 4.5 V decreases, as the amount of molybdenum in the positive electrode active material increases.

Furthermore, the result of the charge and discharge test (at the top of Table 4) carried out using the positive electrode active material free from molybdenum trioxide indicates that the specific discharge capacity in the case where the charge cutoff potential is 5.0 V is smaller than that in the case where the charge cutoff potential is 4.5 V.

TABLE 3

| POSITIVE ELECTRODE ACTIVE MATERIAL [mol] | CHARGE CUTOFF POTENTIAL 4.5[v](vs.Li/Li$^+$) SPECIFIC DISCHARGE CAPACITY [mAh/g] | CHARGE CUTOFF POTENTIAL 5.0[v](vs.Li/Li$^+$) SPECIFIC DISCHARGE CAPACITY [mAh/g] |
|---|---|---|
| $Li_2CO_3$:$Ni(OH)_2$:$MnCO_3$:$WO_3$ = 2:4:1:1 | 29 | 50 |
| $Li_2CO_3$:$Ni(OH)_2$:$MnCO_3$:$WO_3$ = 3:4:1:1 | 32 | 76 |
| $Li_2CO_3$:$Ni(OH)_2$:$MnCO_3$:$WO_3$ = 6:4:1:1 | 94 | 147 |

As shown in Table 3, as the amount of lithium increases, the specific discharge capacities in the cases where the charge cutoff potentials are 4.5 V and 5.0 V increase.

(e) Inventive Example 5

Lithium carbonate ($Li_2CO_3$), nickel hydroxide ($Ni(OH)_2$), manganese carbonate ($MnCO_3$) and molybdenum trioxide ($MoO_3$) were used as starting materials of the positive electrode active materials.

In this example, the above-mentioned lithium carbonate, nickel hydroxide, manganese carbonate and molybdenum trioxide were mixed in a mole ratio of 3:4:0.5:p in this order. The above-mentioned p was set to a total of five types of 0.0, 0.2, 0.4, 0.6 and 0.8 mol.

Furthermore, five types of powders of the positive electrode active materials obtained by mixing were formed in the shape of pellets, respectively. After that, preliminary burning was carried out on each of these positive electrode active materials in the air atmosphere of 700° C. for ten hours and main burning was carried out in the air atmosphere of 800° C. for twenty hours.

Similarly to Inventive Example 2, the test cells of the non-aqueous electrolyte secondary batteries were fabricated using the resultant positive electrode active materials and charge and discharge tests were carried out. The results of the tests are shown in Table 4.

These results indicate that even if the charge and discharge are carried out until the high potential is reached, the crystal structure of the positive electrode active material is inhibited from collapsing and stabilized by containing molybdenum in the positive electrode active material, thereby making it possible to obtain higher energy density.

(f) Inventive Example 6

The test cells of the non-aqueous electrolyte secondary batteries were fabricated in the same method as that in Inventive Example 2, using the positive electrode active materials in the cases of z=0.2 mol and z=0.5 mol obtained in Inventive Example 1.

After the fabricated non-aqueous electrolyte secondary batteries were charged until the specific charge capacity reached 160 mAh/g, those test cells were taken apart and differential scanning calorimetry was carried out. Note that this calorimetry was carried out with the addition of the non-aqueous electrolyte 5 used in Inventive Example 2.

Figure 4:
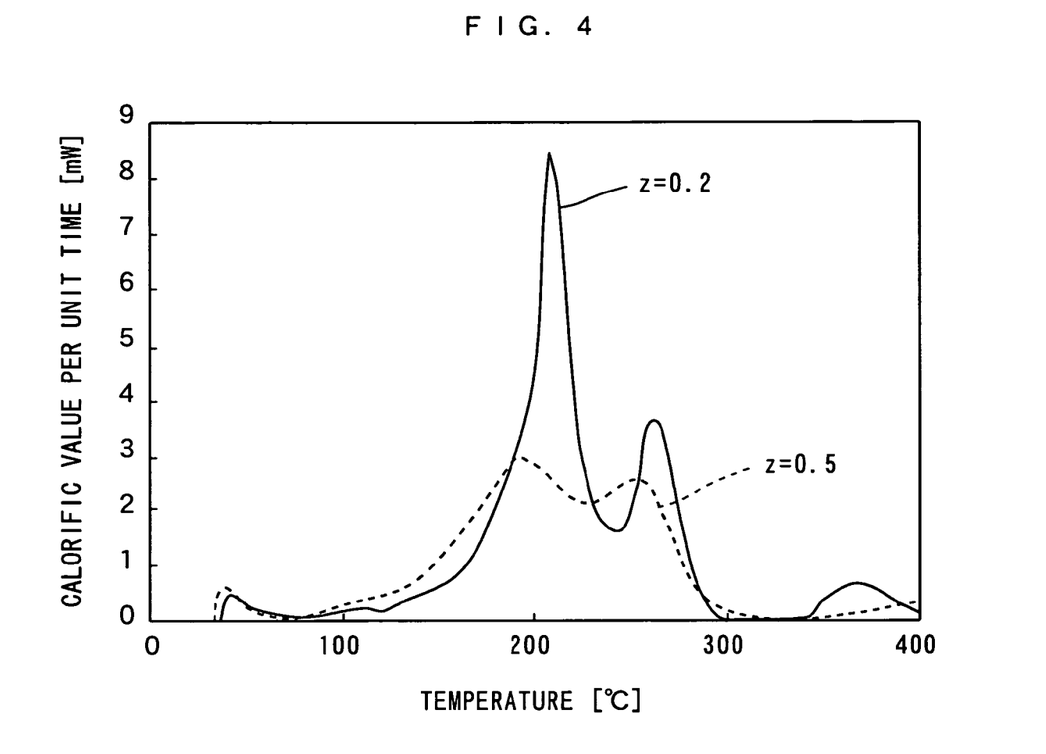
FIG. 4 is a graph showing the results of differential scanning calorimetry.

FIG. 4 is a graph showing the results of differential scanning calorimetry. In FIG. 4, an abscissa axis indicates temperature and an ordinate axis indicates calorific value per unit time, while the measurement results in the case of z=0.2 mol are indicated by a solid line and those in the case of z=0.5 mol are indicated by a dotted line.

TABLE 4

| POSITIVE ELECTRODE ACTIVE MATERIAL [mol] | CHARGE CUTOFF POTENTIAL 4.5[v](vs.Li/Li$^+$) SPECIFIC DISCHARGE CAPACITY [mAh/g] | CHARGE CUTOFF POTENTIAL 5.0[v](vs.Li/Li$^+$) SPECIFIC DISCHARGE CAPACITY [mAh/g] |
|---|---|---|
| $Li_2CO_3$:$Ni(OH)_2$:$MnCO_3$:$MoO_3$ = 3:4:0.5:0 | 180 | 169 |
| $Li_2CO_3$:$Ni(OH)_2$:$MnCO_3$:$MoO_3$ = 3:4:0.5:0.2 | 166 | 195 |
| $Li_2CO_3$:$Ni(OH)_2$:$MnCO_3$:$MoO_3$ = 3:4:0.5:0.4 | 128 | 175 |
| $Li_2CO_3$:$Ni(OH)_2$:$MnCO_3$:$MoO_3$ = 3:4:0.5:0.6 | 75 | 120 |
| $Li_2CO_3$:$Ni(OH)_2$:$MnCO_3$:$MoO_3$ = 3:4:0.5:0.8 | 84 | 87 |

As indicated by FIG. 4, if the amount of tungsten increases, the calorific value is suppressed.

It is figured out by a calculation method mentioned below that the calorific value in the case of z=0.2 mol is 661 J/g and the value in the case of z=0.5 mol is 483 J/g.

In calculating the calorific values, the parameter of the abscissa axis in FIG. 4 were changed from the temperature to time by dividing the parameter by a certain rate of rise in temperature (4° C./min). Moreover, the calorific values were calculated by integrating a region surrounded by the solid line in the case of z=0.2 mol and a region surrounded by the dotted line in the case of z=0.5 mol, respectively.

(g) Evaluation

It has been proved that the crystal structure of the positive electrode active material is stable even if lithium ions are released until the high potential is reached, and a specific discharge capacity of the non-aqueous electrolyte secondary battery can be increased, by using the positive electrode active material including lithium, nickel, manganese and the transition metal that can be in the hexavalent state.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A non-aqueous electrolyte secondary battery comprising:
   a positive electrode including a positive electrode active material and capable of storing and releasing lithium;
   a negative electrode capable of storing and releasing lithium; and
   a non-aqueous electrolyte, wherein
   said positive electrode active material contains lithium, nickel, manganese and hexavalent tungsten, and
   the positive electrode active material has a crystal system that belongs to a space group R-3m.

2. A non-aqueous electrolyte secondary battery comprising:
   a positive electrode including a positive electrode active material and capable of storing and releasing lithium;
   a negative electrode capable of storing and releasing lithium; and
   a non-aqueous electrolyte, wherein
   said positive electrode active material contains lithium, nickel, manganese and hexavalent molybdenum, and
   the positive electrode active material has a crystal system that belongs to a space group R-3m.

3. The non-aqueous electrolyte secondary battery according to claim 1, wherein
   said positive electrode active material is composed of lithium (Li), nickel (Ni), manganese (Mn) and tungsten (W), where the mole ratio is represented as Li:Ni:Mn:W=x: 4:y:z in this order,
   said x is not less than 4 and not more than 12,
   said y is not less than 0.1 and not more than 1.5, and
   said z is not less than 0.1 and not more than 1.5.

4. The non-aqueous electrolyte secondary battery according to claim 2, wherein
   said positive electrode active material is composed of lithium (Li), nickel (Ni), manganese (Mn) and molybdenum (Mo), where the mole ratio is represented as Li:Ni:Mn: Mo=x:4:y:z in this order,
   said x is not less than 4 and not more than 12,
   said y is not less than 0.1 and not more than 1.5, and
   said z is not less than 0.1 and not more than 1.5.

5. The non-aqueous electrolyte secondary battery according to claim 1, wherein
   said negative electrode is composed of a lithium metal, a lithium alloy, a carbon material or a silicon material.

6. The non-aqueous electrolyte secondary battery according to claim 1, wherein
   said non-aqueous electrolyte includes one or more types selected from the group consisting of cyclic carbonic esters, chain carbonic esters, esters, cyclic ethers, chain ethers, nitrils and amides.

7. The non-aqueous electrolyte secondary battery according to claim 2, wherein
   said negative electrode is composed of a lithium metal, a lithium alloy, a carbon material or a silicon material.

8. The non-aqueous electrolyte secondary battery according to claim 2, wherein
   said non-aqueous electrolyte includes one or more types selected from the group consisting of cyclic carbonic esters, chain carbonic esters, esters, cyclic ethers, chain ethers, nitrils and amides.

* * * * *